United States Patent
Abo El-Fotouh

(10) Patent No.: US 8,886,367 B2
(45) Date of Patent: Nov. 11, 2014

(54) COMMUNICATION BETWEEN A VEHICLE AND A CENTRAL UNIT

(71) Applicant: Bayerische Motoren Werke Aktiengesellschaft, Munich (DE)

(72) Inventor: Mohamed Abo El-Fotouh, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/952,819

(22) Filed: Jul. 29, 2013

(65) Prior Publication Data

US 2013/0311003 A1 Nov. 21, 2013

Related U.S. Application Data

(63) Continuation of application No. PCT/EP2012/051611, filed on Feb. 1, 2012.

(30) Foreign Application Priority Data

Feb. 9, 2011 (DE) .......... 10 2011 003 889

(51) Int. Cl.
*G06F 17/00* (2006.01)
*G07C 5/00* (2006.01)
*H04W 4/14* (2009.01)
*H04L 29/08* (2006.01)

(52) U.S. Cl.
CPC ............ *G06F 17/00* (2013.01); *G07C 5/008* (2013.01); *H04W 4/14* (2013.01); *H04L 67/12* (2013.01)
USPC ............................................. 701/2; 701/36

(58) Field of Classification Search
USPC ........................................... 701/2, 36
See application file for complete search history.

(56) References Cited

U.S. PATENT DOCUMENTS

| | | |
|---|---|---|
| 5,732,074 A | 3/1998 | Spaur et al. |
| 2003/0097207 A1* | 5/2003 | Landgraf et al. ............ 701/2 |
| 2005/0102069 A1 | 5/2005 | Mueller |
| 2005/0216296 A1 | 9/2005 | Kokubu |
| 2008/0129445 A1 | 6/2008 | Kraimer et al. |
| 2011/0021234 A1* | 1/2011 | Tibbitts et al. ............ 455/517 |

FOREIGN PATENT DOCUMENTS

| | | |
|---|---|---|
| DE | 697 32 900 T2 | 3/2006 |
| DE | 697 37 486 T2 | 3/2008 |
| DE | 11 2005 000 594 T5 | 8/2009 |
| DE | 10 2009 045 748 A1 | 4/2011 |
| WO | WO 01/61604 A1 | 8/2001 |
| WO | WO 2005/101150 A2 | 10/2005 |
| WO | WO 2006/087217 A2 | 8/2006 |

OTHER PUBLICATIONS

Corresponding International Search Report with English Translation dated Jul. 10, 2012 (ten (10) pages).

(Continued)

*Primary Examiner* — Mary Cheung
*Assistant Examiner* — Yuen Wong
(74) *Attorney, Agent, or Firm* — Crowell & Moring LLP

(57) ABSTRACT

A method is provided for communicating between a vehicle and a central unit, wherein, based on a time base, the central unit transmits a message to the vehicle. Based on the message, a functionality is activated or deactivated in the vehicle. A corresponding central unit as well as a corresponding vehicle for carrying out the method are disclosed.

15 Claims, 2 Drawing Sheets

(56) References Cited

OTHER PUBLICATIONS

German Search Report with English Translation dated Jul. 30, 2012 (ten (10) pages).

International Preliminary Report on Patentability (PCT/IB/373) including Written Opinion (PCT/ISA/237) with English translation thereof dated Aug. 13, 2013 {Twenty-one (21) pages}.

* cited by examiner

COMMUNICATION BETWEEN A VEHICLE AND A CENTRAL UNIT

CROSS REFERENCE TO RELATED APPLICATIONS

This application is a continuation of PCT International Application No. PCT/EP2012/051611, filed Feb. 1, 2012, which claims priority under 35 U.S.C. §119 from German Patent Application No. DE 10 2011 003 889.2, filed Feb. 9, 2011, the entire disclosures of which are expressly incorporated by reference herein.

BACKGROUND AND SUMMARY OF THE INVENTION

The invention relates to a method of communicating between a vehicle and a central unit, to a corresponding central unit, as well as to a corresponding vehicle.

Known vehicles have a display which also displays a clock time. This clock time can be adjusted by the user of the vehicle.

In this case, it is a disadvantage that such an adjustable clock time cannot be used as a trustworthy and therefore reliable time base. It is, for example, not guaranteed that a time-limited functionality, which is provided or cleared in the vehicle and which is coupled to such a clock time, could not be extended by the user for an arbitrary time period by adjusting the clock time.

The functionality may, for example, consist of applications or functions of the vehicle or in the vehicle which are provided to the user, for example, free-of-charge for a certain time period. After the expiration of this time period, the user has the option of extending the usability of the functionality, for example, by purchasing the functionality or by purchasing a time-of-use. After the expiration of this time period, the user can also decide to no longer use the functionality.

It is an object of the present invention to avoid the above-mentioned disadvantages and, in particular, to create a solution which reliably permits a time-limited use of a functionality by the user of a vehicle.

This and other objects are achieved according to the invention by providing a method of communicating between a vehicle and a central unit. Based on a time base, the central unit transmits a message to the vehicle. Based on the message, a functionality is activated or deactivated in the vehicle.

The central unit may, for example, be a backend of a vehicle manufacturer or service provider. The backend comprises, for example, at least one computer or at least one computer network, which can communicate at least temporarily with the vehicle by way of a mobile communication interface (such as a mobile radio network, a WLAN, etc.). The backend may further have a connection to the internet.

The time base preferably is a (trustworthy) time unit, which provides a clock time and/or a date. The time base may preferably be arranged in the vehicle manufacturer's or service provider's domain.

The message can be created and transmitted based on the time base. In particular, the message can be generated and transmitted to the vehicle in the presence of a predefined time condition. The message can be generated and transmitted to the vehicle, for example, after an expiration of a time period.

Based on the message, at least one functionality in the vehicle can be activated or deactivated. Based on a time expiration determined by the time base, particularly a previously activated functionality can be deactivated by way of the correspondingly transmitted message.

It is a further development of the invention that the message is transmitted from the central unit to the vehicle in an encrypted and/or signed manner. The encrypting and/or signing can take place, for example, by using an identification of the vehicle.

It is a further development of the invention that the message is checked in the vehicle and, when the check is successful, the functionality is activated or deactivated based on the message. For example, the message can be decrypted, authenticated and/or verified by the vehicle.

In particular, it is another further development of the invention that the central unit and the vehicle are mutually connected, at least temporarily, by way of a wireless communication interface. The wireless communication interface may be a mobile radio interface, a WLAN interface, a Bluetooth interface or another wireless communication interface.

It is also a further development of the invention that the functionality comprises a functionality stored in the vehicle and/or a functionality that was loaded (or is possibly still being loaded) by the central unit or another communication unit.

It is also a further development that the time base provides a clock time and/or a date, the message including the clock time and/or the date.

Within the scope of an additional further development, the message includes a command for the activation or deactivation of the functionality. Optionally, the message may include the command as well as a time information, for example, the date and/or the clock time.

A still further development consists of the fact that, when the functionality is activated, a first time information is stored and, when a predefined time duration is reached and/or exceeded, the functionality is deactivated starting from the first time information. For example, when the predefined time period (such as a trial period) is reached or exceeded, the central unit can deactivate the functionality by use of the message described here.

In an embodiment, when the predefined time duration is reached and/or exceeded, a message for deactivating the functionality is transmitted from the central unit to the vehicle.

In an alternative embodiment, when the predefined duration is reached and/or exceeded, the vehicle deactivates the functionality starting from the first time information. Thus, the vehicle can determine, for example, by use of a processing unit (such as a head unit), whether the time information from the central unit indicates that the functionality should be deactivated and, if required, transmit the functionality based on the time information provided by the central unit.

Another embodiment consists of the fact that: (i) the vehicle requests a time information; and (ii) the central unit determines the time information based on the time base and transmits it to the vehicle. The vehicle can therefore regularly and/or irregularly, for example, at predefined points in time, request the time information.

It is a further development that the vehicle transmits a confirmation message concerning the activation or the deactivation of the functionality to the central unit.

As described herein, a "functionality" may include:
a service,
an application,
a program,
an updating function,
data.

Thus, data can be cleared by means of the functionality (for example, expanded navigation data). The functionality may also consist of services, programs, applications or upgrade functions. Multimedia services, for example, can be cleared in this manner. It is also contemplated that hardware and/or software functions of the vehicle (for example, digital audio broadcast, TV reception, auxiliary heating) are cleared in this manner. Parameters of the vehicle can also be cleared or changed (for example, sporty characteristic engine curve, direct steering, etc.).

The functionality may basically be fee-based. It is also contemplated that the use of the functionality may be free-of-charge or fee-based for a predefined time period. It is particularly an option that the user purchases the functionality and can then use it permanently or for a predefined time period. Before the purchase, a trial period for a free-of-charge use of the functionality may be offered. After the expiration of the trial period, the functionality may be automatically deactivated.

The above-mentioned object is also achieved by providing a central unit for communicating with a vehicle and including a processing unit that is set up such that, based on a time base, a message can be transmitted from the central unit to the vehicle, so that, based on the message in the vehicle, a functionality can be activated or deactivated.

The above-mentioned object is also achieved by providing a vehicle having a processing unit that is set up such that a message can be received by a central unit based on a time base, and based on the message, a functionality can be activated or deactivated.

DETAILED DESCRIPTION OF THE DRAWING

Figure 1:
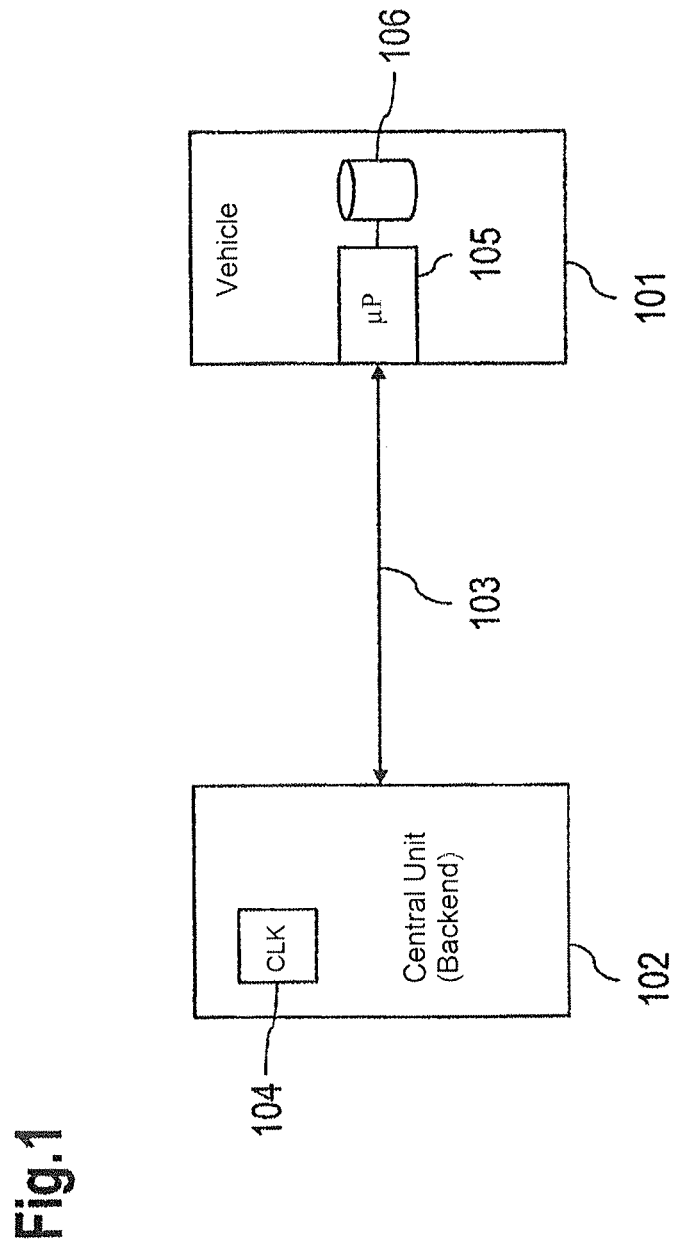
FIG. 1 is a simplified block diagram of a vehicle which is connected with a central unit backend by way of a communication interface.

Increasingly, functionalities for a vehicle or in a vehicle can be offered or cleared, for example, as applications or additional services. This may particularly take place for a fee. Before a user purchases such a functionality, the user may advantageously be given the opportunity to use this functionality free-of-charge for a certain time period. In such a scenario, it is important that a mutual trust is created between the provider of the functionality and the user, so that a time-limited use of the functionality is in fact limited with respect to the time. The user can therefore try out the functionality for a certain time period without immediately having to purchase it. After this trial period, the functionality will stop its service unless the user purchases it.

It should be noted here that the purchase of the functionality may comprise a complete clearing of the functionality or a clearing of the functionality for a predefined time period. It is also contemplated that the duration of the trial period is linked to a certain fee, for example, a reduced fee for a firmly predefined trial period. The functionality will preferably terminate its service after the time period of the (free-of-charge or fee-based) trial and can—unless the user extends, for example, purchases the functionality,—no longer be used by the user. The approach herein effectively prevents the time duration of the trial from being extended by changing the clock time and the date in the vehicle.

The approach described here therefore provides a trustworthy or secure time base and thereby permits a cost-efficient implementation for a time-limited trial of the functionality.

It is particularly provided that a secure time base be used. The secure time base may, for example, be guaranteed by a secure or synchronized and/or manipulation-proof clock time. The clock time mentioned here especially includes a date.

The communication may, for example, take place between the vehicle and a central unit (here also called a backend). The backend may be provided by a vehicle manufacturer or service provider and includes, for example, at least one computer or at least one computer network, which can communicate at least temporarily with the vehicle by way of a mobile communication interface (such as a mobile radio network, a WLAN, etc.). The backend may further have a connection to the internet.

A time base may be implemented in the backend, by way of which the functionality in the vehicle can be activated and/or deactivated. The backend can at least temporarily, by way of the communication interface (also called communication channel), exchange data so that the functionality can be reliably deactivated, for example, with the expiration of a trial period. The communication between the backend and the vehicle can take place by way of different communication interfaces, such as WLAN, UMTS, EDGE, LTE, GSM, etc. By way of the communication interface, for example, an SMS, a secure SMS, an online message or the like can be transmitted. The message can be encrypted and/or signed. An identification of the vehicle, for example, can be used for the encrypting and/or signing of the message.

The activation of the functionality can take place, for example, in that the vehicle registers the functionality at the backend and thereby determines the start of the trial period. The backend can monitor the duration of the trial period and, after the expiration of the trial period, send a message to the vehicle by way of which the functionality can be deactivated. The message may include an instruction for the deactivation of the functionality and/or contain a time information (clock time and/or date), by which a processing unit in the vehicle determines whether (or that) the trial period has expired. Such a time information can be provided on a regular basis (for example, every day or all "n" days or at each "m" th drive start), so that the processing unit can automatically determine when the trial period for a functionality has expired.

Figure 2:
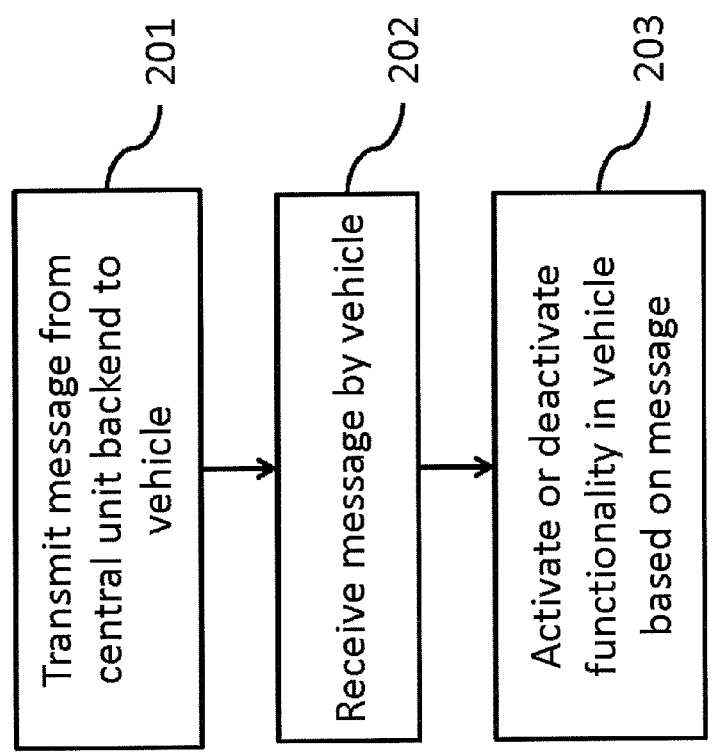
FIG. 2 shows a method of communicating between the vehicle and the central unit backend.

FIG. 1 illustrates a vehicle 101, which may be connected with a central unit backend 102 by way of a communication interface 103. FIG. 2 illustrates a method of communicating between the vehicle 101 and the central unit backend 102. The communication interface 103 may have a unidirectional or bidirectional configuration. The backend 102 transmits a message, such as a secure SMS, by way of the communication interface 103 to the vehicle 101 at step 201. The message may comprise a command "Activate GPS Reception for the Duration of 3 Months".

The command includes, for example, a time information (for example, date and clock time) based on a trustworthy time base (clock) 104. The vehicle 101 receives the message at step 202. A processing unit 105 of the vehicle 101 verifies the message and, if the message is authentic, the processing unit updates, for example, a status in a data bank 106: for example, the functionality "GPS Reception" in the data bank 106 is set to "activated" at step 203, in which case the time information provided in the message can be stored in the data bank 106.

It is to be noted here that the time information does not have to be a component of the message. Rather, the message may only contain the command "Activate GPS Reception". The monitoring and control of the use or trial periods for the functionalities of the vehicle can thereby (for example, exclusively) be implemented on the backend side.

It is further contemplated that the functionality has already been implemented in the vehicle 101 but not yet cleared. In this case, the vehicle 101 can send a message to the backend 102 by way of the processing unit 105 with the request to clear the functionality (here, in the example, "GPS Reception"). Subsequently, the backend 102 will examine, for example, the authenticity of the message and the reliability of the clearing and, if required, send the above-explained command "Activate GPS Reception" with or without time information.

As an alternative, a functionality, for example, an application or a program, can be loaded by way of a portal of the backend 102. Subsequently, a request to clear for the loaded functionality can be transmitted from the vehicle 101 by way of the processing unit 105 to the backend 102. The backend 102 will check the request and, as required, clear the functionality by means of a corresponding command. For the first time, the clearing can be linked to a trial period, the functionality being deactivated after the expiration of the trial period.

If the trial period amounts to, for example, 3 months, after the expiration of these 3 months (determined by way of the time base 104), the backend 102 will send a message, such as a secure SMS, with the command "Deactivate GPS Reception", by way of the communication interface 103, to the vehicle. This message can optionally include a time information of the backend 102, for example, the time base 104. The processing unit 105 will check this message and, if required, deactivate the functionality "GPS Reception" by updating the status of this functionality in the data bank 106 (status change from "activated" to "deactivated").

Optionally, the vehicle 101 may receive time information on a more or less regular basis by way of the communication interface 103 from the backend 102. By use of the time information, the processing unit 105 can determine whether the use period of the functionality already has expired. For this purpose, the processing unit 105 preferably stores, for example, in the data bank 106, in addition to the transmitted time information during the activation of the functionality, also the permissible use duration (for example, a trial period). Thus, a reaching or exceeding of the permissible use period can automatically be determined by the processing unit 105 of the vehicle 101 and thereby the functionality can be deactivated.

An imminent deactivation of a functionality may optionally be displayed to the user so that the user has the opportunity to extend the use period of this functionality in time, for example, by purchasing the functionality (for a defined duration or for an unlimited time period).

In particular, it is an option that the receipt of a message and/or a status change, such as a deactivation of a functionality in the vehicle 101, is confirmed to the backend 102. For this purpose, a corresponding (for example, secure) message can be sent to the backend 102. In the backend 102, the receipt of the message can be stored together with a time stamp of the time information. Correspondingly, an activation of the functionality with a message, which is transmitted by way of the communication interface 103 from the vehicle 101 to the backend 102, can also be displayed.

A confirmation of the receipt of a message or of a status change to the backend 102 has the advantage that the backend 102 can check whether the message has in fact been received at the vehicle (and, if required, the necessary status change has also taken place).

This is particularly advantageous when the vehicle 101, at least temporarily, has no connection with the backend 102, so that a possible deactivation message could not arrive at the vehicle 101 and could not lead to a deactivation of the functionality. In this case, it should be ensured that, at least when a receiving range has been reached again by the vehicle 101, the message will then reach the vehicle and the deactivation of the functionality will take place.

It is a further option that the time information is actively requested by the vehicle 101 at the backend 102. This time information can be used as a decision basis as to whether the functionality is activated, can remain activated or is deactivated.

It is another option that the transmission of the message from the backend 102 to the vehicle 101 takes place in an encrypted manner. In particular, the encrypting can take place by using an identification of the vehicle 101, so that the decrypting effectively can take place only in the addressed vehicle 101.

The management of the time information (in a trustworthy manner) therefore preferably takes place in the time base 104 of the backend 102. The commands from the backend 102 to the vehicle 101 ensure that the functionality is activated, remains activated or is deactivated. This can take place after the expiration of predefined time periods which may be partially fee-based or free-of-charge.

A further advantage consists of the fact that the processing unit 105 is part of a central processing unit of the vehicle 101, for example, of a so-called head unit. It can also be ensured by the head unit that any manipulation of the data stored in the vehicle becomes clearly more difficult.

The functionality may be a service, data or an application, such as a GPS service, an updating function (update) of programs, navigation services, multimedia data, multimedia services, expanded services of the vehicle, services for linking external devices in the vehicle, services concerning interfaces (for example, between the vehicle and an external device), etc.

The use of the functionality may at least temporarily be fee-based. In particular, the use of the functionality for a trial period may be possible free-of-charge or for a reduced fee.

The method and system described herein further advantageously utilize a centralized structure in that the backend can activate and/or deactivate functionalities in the vehicle. As a result, the management of the activation and deactivation can take place in a centralized and, therefore, simplified manner. The decision concerning an activation or deactivation of a functionality can take place in a trustworthy domain, for example, that of the vehicle manufacturer or of a service provider. The backend may, for example, have a trustworthy time base (clock time), by which the activation and/or deactivation of the functionalities in the vehicle takes place. Messages, particularly secure messages and/or a secure transmission of messages, can be used in order to provide additional functionalities in the vehicle. Furthermore, it is an advantage that this approach saves energy, because no secure time base has to be permanently activated on the vehicle side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of communicating between a vehicle and a central unit that is external to the vehicle, the method comprising the acts of:
   determining, by the central unit, whether a status change indicating a defined duration of a functionality in the vehicle has occurred;

sending, by the central unit, a message including status change information when the status change has occurred;

receiving, by a processing unit in the vehicle, the message transmitted from the central unit based on a time base determined by the central unit, wherein the time base indicates a current time;

deactivating, by the processing unit in the vehicle, the functionality in the vehicle based on the time base determined by the central unit;

confirming, by the processing unit in the vehicle to the central unit, at least one of the receipt of the message and the deactivation of the functionality in the vehicle; and storing, by the central unit, a confirmation of the at least one of the receipt of the message and the deactivation of the functionality in the vehicle, with a time stamp;

wherein:

the central unit is located in a domain of a manufacturer of the vehicle or a service provider of the vehicle, and the time base is secure and includes at least one of a clock time and a date.

2. The method according to claim 1, wherein the received message is at least one of an encrypted and signed message transmitted from the central unit.

3. The method according to claim 1, further comprising the acts of:

checking, in the vehicle, the received message; and deactivating the functionality based on the received message when the act of checking is successful.

4. The method according to claim 1, wherein the act of receiving is carried out via a wireless communication interface at least temporarily mutually connecting the vehicle and the central unit.

5. The method according to claim 1, wherein the functionality comprises at least one of:

a functionality stored in the vehicle; and a functionality loaded into the vehicle via the central unit or another communication unit.

6. The method according to claim 1, wherein the received message includes a command for the deactivation of the functionality.

7. The method according to claim 2, wherein the received message includes a command for the deactivation of the functionality.

8. The method according to claim 1, wherein, the message is received upon reaching a predefined time duration that began upon activation of the functionality.

9. The method according to claim 1, further comprising the act of:

upon reaching a predefined time duration, deactivating, by the vehicle, the functionality in the vehicle.

10. The method according to claim 1, further comprising the act of:

requesting, by the vehicle, time information; and receiving, in the vehicle, the requested time information based on the time base determined by the central unit and transmitted to the vehicle.

11. The method according to claim 1, further comprising the act of:

transmitting, by the vehicle, a confirmation message indicative of the deactivation of the functionality, to the central unit.

12. The method according to claim 1, wherein the functionality comprises one of a service, an application, a program, an updating function, and data.

13. A central unit configured for communicating with a vehicle, wherein the central unit is external to the vehicle, the central unit comprising:

a processing unit comprising a memory having stored therein program code segments that:

determine whether a status change indicating a defined duration of a functionality in the vehicle has occurred, send a message including status change information when the status change has occurred, based on a time base determined by the central unit, transmit the message from the central unit to the vehicle, said message being configured to deactivate the functionality in the vehicle based on the time base determined by the central unit, wherein the time base indicates a current time, receive confirmation, from a processing unit in the vehicle, of at least one of the receipt of the message and the deactivation of the functionality in the vehicle, and store the at least one of the receipt of the message and the deactivation of the functionality in the vehicle, with a time stamp, wherein:

the central unit is located in a domain of a manufacturer of the vehicle or a service provider of the vehicle, and the time base is secure and includes at least one of a clock time and a date.

14. A vehicle, comprising:

a processing unit comprising a memory having stored therein program segments that:

receive a message transmitted from a central unit that is external to the vehicle, based on a time base determined by the central unit, wherein the time base indicates a current time, wherein the central unit determines whether a status change indicating a defined duration of a functionality in the vehicle has occurred, and wherein the central unit sends the message including status change information when the status change has occurred, deactivate the functionality in the vehicle based on the time base determined by the central unit, and confirm, to the central unit, at least one of the receipt of the message and the deactivation of the functionality in the vehicle, wherein the central unit subsequently stores the at least one of the receipt of the message and the deactivation of the functionality, with a time stamp, wherein:

the central unit is located in a domain of a manufacturer of the vehicle or a service provider of the vehicle, and the time base is secure and includes at least one of a clock time and a date.

15. A method of communicating between a vehicle and a central unit that is external to the vehicle, the method comprising the acts of:

sending, by the central unit, at predefined points in time, a message including time information based on a time base determined by the central unit, wherein the time base indicates a current time;

receiving, by a processing unit in the vehicle, the message transmitted from the central unit, determining, by the processing unit in the vehicle, whether a status change indicating a defined duration of a functionality in the vehicle has occurred;

deactivating, by the processing unit in the vehicle, the functionality in the vehicle based on the message including the time base determined by the central unit, confirming, by the processing unit in the vehicle to the central unit, at least one of the receipt of the message and the deactivation of the functionality in the vehicle; and storing, by the central unit, a confirmation of the at least one of the receipt of the message and the deactivation of the functionality in the vehicle, with a time stamp; wherein:

the central unit is located in a domain of a manufacturer of the vehicle or a service provider of the vehicle, and the time base is secure and includes at least one of a clock time and a date.

* * * * *